May 7, 1935.　　　G. G. HARRINGTON　　　2,000,076
ROLLER BIT
Filed Oct. 3, 1932

George G. Harrington
INVENTOR.

BY J. Vincent Martin
ATTORNEY.

Patented May 7, 1935

2,000,076

UNITED STATES PATENT OFFICE 2,000,076

ROLLER BIT

George G. Harrington, Houston, Tex., assignor to Reed Roller Bit Company, Houston, Tex., a corporation of Texas Application October 3, 1932, Serial No. 635,937

5 Claims. (Cl. 255—71)

This invention relates generally to deep well drills, and specifically to roller bits.

It has for its specific object to provide a bit having a new and improved anti-friction mounting to afford a strong support for its roller cutters; the cutters being quickly and easily mountable in and removable from the head.

Figure 1:
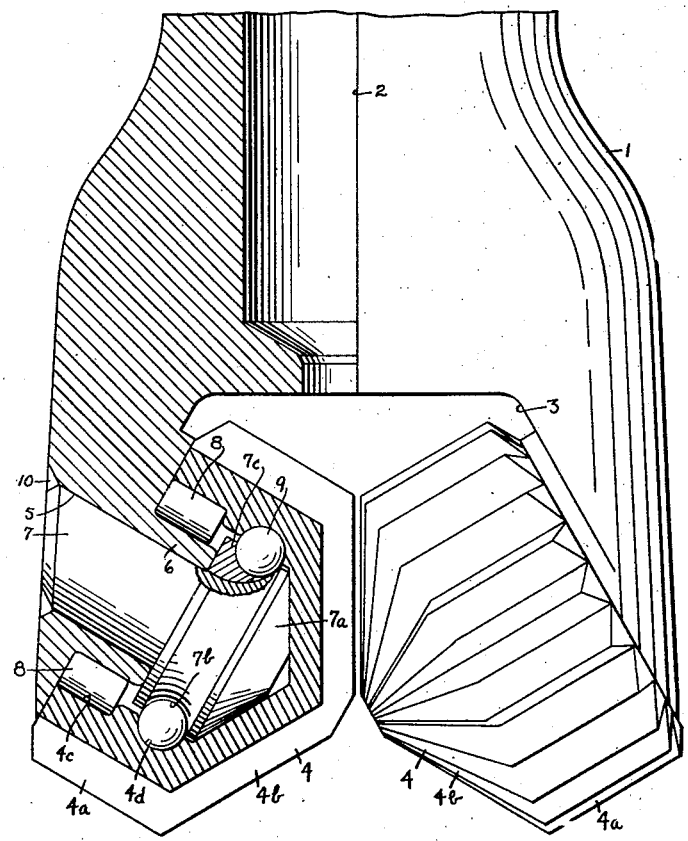
Figure 2:
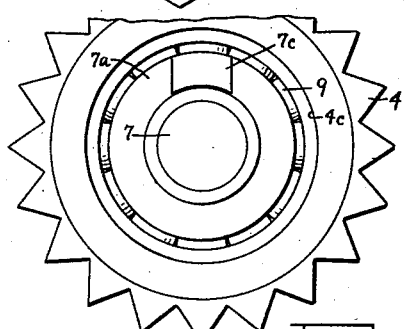

The preferred embodiment of the invention is illustrated by the accompanying drawing, of which Fig. 1 is a partly sectional fragmentary elevation of the bit; and Fig. 2, a view of the assembled cutter and pin.

In the drawing, the bit head is indicated at 1. It is divided longitudinally on the line 2, the sections being separably connected together by conventional means not shown.

In the lower end of the head is a cutter recess 3 in which are mounted a pair of roller cutters 4 on axes extending downwardly and inwardly toward the longitudinal axis of the head. Each of the cutters 4 has a substantially cylindrical base portion 4a, and a substantially conical point portion 4b, and is mounted in the head by means which will now be described:

Extending outwardly and upwardly from the cutter recess 3 is an opening 5; and on the inner wall of the recess, surrounding the opening 5, is an annular bearing flange 6. In the opening 5 is a pin 7, having an enlarged inner bearing end 7a in the periphery of which is a ball raceway 7b. Forming a part of said raceway is a removable plug 7c. The cutter 4 has in that part of its base portion 4a remote from its point portion 4b a roller raceway 4c; and in that part of said base portion 4a adjacent said point portion 4b a ball raceway 4d. Surrounding the annular flange 6 and in the raceway 4c are rollers 8; and in the raceways 7b and 4d are balls 9. The greatest load is on the base portion of each cutter and this load is taken by the rollers 8 which bear directly on the flange 6 of the bit head. A strong and efficient anti-friction bearing is thereby provided and the cutter is rotatably locked on the head. The pin 7 may be locked in the head by welding it thereto, a space 10 being provided for this purpose.

The parts are assembled as follows:

The enlarged end 7a of the pin 7 is first placed within the cutter 4. The plug 7c having been removed, the balls 9 are inserted through the space left thereby into the raceways 4d and 7b. The plug 7c is then replaced. The rollers 8 are then placed in the raceway 4c and held therein by heavy grease. The two sections of the head 1 having been separated, the pin 7 is then inserted in the opening 5 and welded in place. The other cutter having been likewise mounted in the other section of the head, the two sections of the head are united by the conventional means not shown and the bit is then ready for use.

The various advantages of this invention will be apparent to those skilled in the art.

The invention is not limited to the preferred embodiment herein disclosed. Various changes may be made within the scope of the following claims.

I claim:

1. In a roller bit: a head having a cutter recess in the bottom thereof, a pin opening extending outwardly and upwardly from said recess to the exterior of said head, and an annular flange on the wall of said recess about said opening; a cutter pin in said opening and having an enlarged portion in said recess and bearing against said flange, said enlarged portion having a ball raceway therein, and a removable plug forming a part of said raceway; a roller cutter enclosing said flange and the enlarged portion of said pin, said cutter having a roller raceway in alignment with said flange and a ball raceway in alignment with the ball raceway of said pin; balls insertable into said ball raceways upon removal of said plug and through the space left thereby, and serving to rotatably lock said cutter on said pin when said plug is replaced; and rollers between said flange and said roller raceway; said cutter having a substantially cylindrical base portion about said balls and rollers and a substantially conical point portion extending inwardly of said head from said base portion.

2. In a roller bit: a head having a cutter recess in the bottom thereof, a pin opening extending outwardly and upwardly from said recess, and an annular flange on the wall of said recess about said opening; a cutter pin in said opening and having an enlarged portion in said recess and bearing against said flange, said enlarged portion having a ball raceway therein; and a removable plug forming a part of said raceway; a roller cutter enclosing said flange and the enlarged portion of said pin, said cutter having a roller raceway in alignment with said flange, and a ball raceway in alignment with the ball raceway of said pin; balls insertable into said ball raceways upon removal of said plug and through the space left thereby, and serving to rotatably lock said cutter on said pin when said plug is replaced; and rollers between said flange and said roller raceway.

3. In a roller bit: a head having a cutter recess in the bottom thereof, a pin opening extending outwardly and upwardly from said recess, and an annular flange on the wall of said recess about said opening; a cutter pin in said opening and having an enlarged portion in said recess and bearing against said flange, said enlarged portion having a ball raceway therein, a roller cutter enclosing said flange and the enlarged portion of said pin, said cutter having a roller raceway in alignment with said flange and a ball raceway in alignment with the ball raceway of said pin; balls in said ball raceways and serving to rotatably lock said cutter on said pin; and rollers between said flange and said roller raceway.

4. In a roller bit: a head having a cutter recess in the bottom thereof, a pin opening extending outwardly and upwardly from said recess, and an annular flange on the wall of said recess about said opening; a cutter pin in said opening, and having a bearing portion extending into said recess, said bearing portion having a ball raceway therein; a roller cutter enclosing said flange and bearing portion; said cutter having a roller raceway in alignment with said flange and a ball raceway in alignment with the ball raceway of said bearing portion; balls in said ball raceways and serving to rotatably lock said cutter on said pin; and rollers between said flange and said roller raceway.

5. In a roller bit: a head having a cutter recess in the bottom thereof and an annular flange extending downwardly and inwardly from one side wall of said recess; a roller cutter enclosing said flange and having a raceway; rollers between said raceway and said flange; and a pin connected to said flange and cutter to rotatably lock said cutter on said flange, said rollers being rotatable on axes substantially parallel with the axis of said cutter.

GEORGE G. HARRINGTON.